United States Patent [19]

Brownstein

[11] Patent Number: 4,482,924
[45] Date of Patent: Nov. 13, 1984

[54] VIDEO PLAYER, FILM MEDIUM, AND PHOTOGRAPHIC PRINTER FOR AUTOMATIC CROPPING

[75] Inventor: Scott A. Brownstein, Rochester, N.Y.

[73] Assignee: Eastman Kodak Company, Rochester, N.Y.

[21] Appl. No.: 427,069

[22] Filed: Sep. 29, 1982

[51] Int. Cl.³ .................. H04N 1/22; H04N 5/30; G03B 27/34
[52] U.S. Cl. .................. 358/302; 358/209; 355/40
[58] Field of Search .......... 358/209, 76, 214, 80, 358/77, 287, 302; 355/40, 41, 56, 18, 55; 352/92; 354/105

[56] References Cited

U.S. PATENT DOCUMENTS

| | | | |
|---|---|---|---|
| 3,490,844 | 1/1970 | Sapp, Jr. | 355/40 |
| 3,824,336 | 7/1974 | Gould et al. | 358/214 X |
| 4,001,878 | 1/1977 | Weimer | 358/41 |
| 4,097,892 | 6/1978 | Balding | 358/76 X |
| 4,132,469 | 1/1979 | Harvey | 353/25 |
| 4,215,920 | 8/1980 | Butler | 352/92 |
| 4,302,523 | 11/1981 | Audran et al. | 430/104 |
| 4,340,286 | 7/1982 | Carr | 354/105 |
| 4,441,807 | 4/1984 | Bartz | 355/40 |

OTHER PUBLICATIONS

"An All–Electronic Camera By Kodak?", Tenies Union Newspaper, Wed., Oct. 28, 1981.

Primary Examiner—Howard W. Britton
Assistant Examiner—Victor R. Kostak
Attorney, Agent, or Firm—Thomas H. Close

[57] ABSTRACT

Photographic film having an image and means for receiving coded indicia is viewed in a film video player to produce a television signal for displaying the film image. The film video player includes cropping means for selectively varying the magnification of the displayed image and for selectively translating a magnified displayed image vertically and/or horizontally, and recording means for applying coded indicia to the film, specifying a selected magnification and vertical and horizontal translation. A printer for making reflection prints from the photographic film includes reading means for reading the coded indicia on the film and cropping means for varying the magnification of the printed image, and translating a magnified image vertically and/or horizontally, in response to the coded indicia.

8 Claims, 3 Drawing Figures

VIDEO PLAYER, FILM MEDIUM, AND PHOTOGRAPHIC PRINTER FOR AUTOMATIC CROPPING

BACKGROUND OF THE INVENTION

Cross Reference To Related Applications

U.S. patent application Ser. No. 427,061, "Film Video Player With Zoom and Scan" by S. Brownstein, filed on Sept. 29, 1982;

U.S. patent application Ser. No. 426,426, "Film Video Player Having Flash Illuminated Area Image Sensor and Single Frame CCD Image Sensor for Use Therewith" by T. H. Lee and L. Moore, filed Sept. 29, 1982;

U.S. patent application Ser. No. 427,077, "Film Video Player With Zoom, Scan, and Automatic Border Control" by W. T. Fearnside, filed Sept. 29, 1982;

U.S. patent application Ser. No. 427,060, "Packette for Processed Color Negative Film and Film Video Player Cooperating Therewith" by S. Brownstein filed Sept. 29, 1982.

Field of the Invention

The present invention relates to the field of photography, and more particularly to means for displaying and reproducing photographic film images.

DISCUSSION RELATED TO THE PROBLEM

Ofttimes the appearance or interest of a photographic print can be improved by enlarging the image of only a portion of the photographic original, e.g. color negative film. Professional photographers use this technique (called cropping) routinely to produce pictures of maximum interest and visual impact. Amateur photographers who do their own printing likewise routinely employ the use of cropping to improve the appearance of their pictures. Cropping is available as an optional service to the large majority of amateur photographers who have their pictures printed by commercial photofinishers, but the service is used relatively infrequently with rather mixed results. One of the problems encountered by the average amateur photographer is that of identifying to the photofinisher exactly what part of the original picture is to appear in the final print. This is usually accomplished by the customer indicating the portion on a standardized order blank, and requires an extensive exercise of the imagination to visualize how the final print will appear.

It is believed that the average quality of amateur snapshots could be considerably improved if the customer was provided with a convenient way of visualizing the appearance of a cropped picture, and specifying to the photofinisher exactly what part of the picture is to be printed. It would also aid the photofinisher, if there was provided a convenient, cost effective way of responding to the customer's needs. Presently, no such photographic systems are available.

SOLUTION TO THE PROBLEM—SUMMARY OF THE INVENTION

The above-noted problems are solved according to my invention by providing a photographic film with means for receiving encoded indicia. A film video player is provided to produce a television signal for displaying the film image. The video player includes cropping means for selectively varying the magnification of the displayed image, and for selectively translating a magnified displayed image vertically and/or horizontally. The video player also includes recording means for applying coded indicia to the film specifying a selected magnification and vertical and horizontal translation. A photographic printer for making reflection prints from the photographic film is provided with reading means for reading the coded indicia on the film and cropping means for varying the magnification of the image to be printed, and for translating a magnified image vertically and/or horizontally in response to the coded indicia. According to a preferred embodiment of the invention, the film is provided with a magnetic recording medium, the video player is provided with a magnetic recording head, and the printer is provided with a magnetic read head. The coordinates of the cropped image in the video player are magnetically encoded on the film by the magnetic recording head. The coordinates of the cropped image are read in the printer by the magnetic read head. The coordinates are automatically implemented by the control electronics of the printer.

BRIEF DESCRIPTION OF THE DRAWINGS

The invention will be described with reference to the accompanying drawings, where.

DESCRIPTION OF THE PREFERRED EMBODIMENTS

Figure 1:
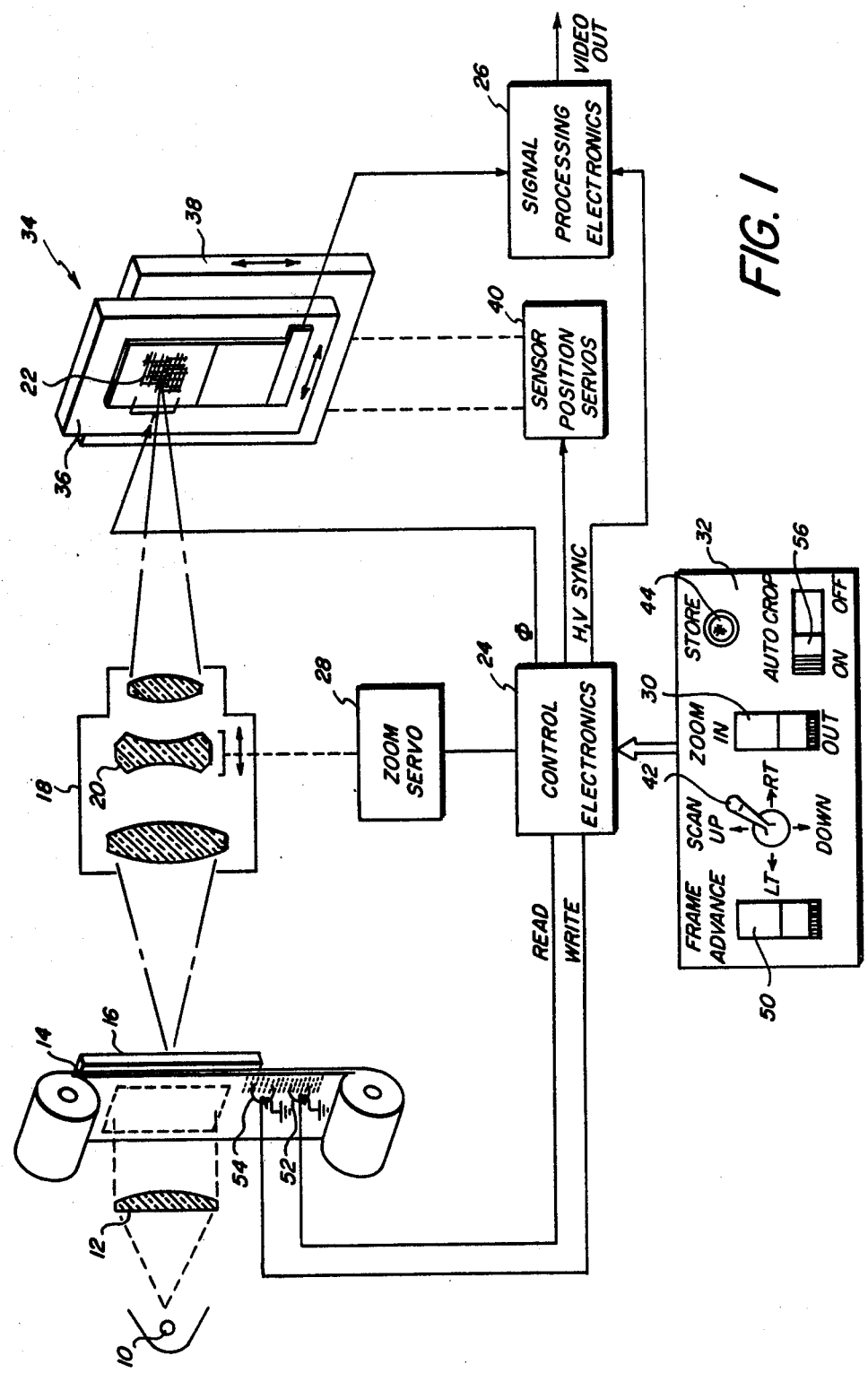
FIG. 1 is a schematic diagram of a video player having variable magnification, means for translating a magnified image horizontally and vertically, and means for applying an encoded message on the film representing the selected magnification and horizontal and vertical image position according to the present invention.

A film video player having selectively variable magnification, adjustable horizontal and vertical image display, and means for recording the magnification and horizontal and vertical adjustments according to the present invention, is shown schematically in FIG. 1. The video player includes a light source 10 and a condenser lens 12 for illuminating an information bearing medium such as a photographic color negative film 14 in a film gate 16. An image of the illuminated film in the gate is formed by a zoom lens 18 having a movable element 20 on a solid state color image sensing array 22. The solid state image sensor, such as a CCD frame transfer image sensor with an integral color filter array is responsive to light to produce a plurality of color video signals. Such an image sensor is described in U.S. Pat. No. 4,001,878 issued Jan. 4, 1977 to P. K. Weimer. The solid state color image sensor 22 is driven in a known manner by polyphase clock signals Φ generated by control electronics 24. The output of the solid state image sensor 22 along with horizontal and vertical synchronization signals H and V from the control electronics 24 are supplied to signal processing electronics 26 which produce a standard color video signal in a known manner.

The film video player is provided with means for selectively changing the magnification of the image of the film on the image sensor 22. In the preferred embodiment shown in FIG. 1, lens element 20 is movable in zoom lens 18 to change the magnification of the zoom lens. The position of movable lens element 20 and hence the magnification of the zoom lens is controlled by a zoom servo 28 comprising for example, a stepper motor driven by control electronics 24. The position of zoom servo 28 is selected for example, by operating a rocker switch 30 on a control unit 32. When the rocker switch 30 is actuated in one direction, the image is zoomed "in" or magnified, and when operated in the other direction, the image is zoomed "out" or made smaller.

The image sensor 22 is carried by an X/Y translation stage generally designated 34. The X/Y translation stage 34 includes a first platform 36 which carries the image sensor 22 and is movable in the horizontal direction as seen in FIG. 1. A second platform 38 carries the first movable platform 36 and is movable in a vertical direction as seen in FIG. 1. The movable platforms 36 and 38 are driven by sensor position servos 40, comprising for example a pair of stepper motors controlled by control electronics 24. The positions of movable platforms 36 and 38 are selectively controlled by a joy stick 42 on control unit 32. The operator of the video player uses the control unit 32 to selectively change the magnification of the image on the television, and to shift the image vertically and horizontally, thereby cropping the image to suit the operator's taste. When the image has been cropped to the satisfaction of the operator, coordinates of the cropped image, i.e. the magnification and the horizontal and vertical positions of the image sensor are recorded on the film by actuating a "store" button 44 on control unit 32. Actuation of button 44 causes control electronics 24 to apply coded indicia to the film, representing the coordinates of the composed image. According to the preferred embodiment of the invention, the film includes a magnetic recording medium, such as a magnetic stripe along an edge thereof, or a transparent magnetic coating on the film. Suitable transparent magnetic coatings are described in U.S. Pat. No. 4,302,523 issued Nov. 24, 1981 to Audran et al. The magnetic recording medium may also comprise or be carried by a support member permanently attached to the film, such as a plastic slide mount impregnated with magnetic particles, or the plastic hub on disc format film. The hub on disc format film is impregnated with magnetic particles, and is provided with a recording surface which is addressed by rotating the hub past a magnetic recording head.

Figure 3:
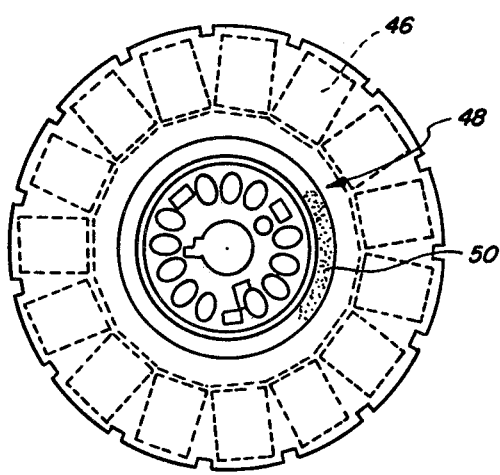
FIG. 3 is a schematic diagram of a disc film unit, showing the area on the hub reserved for magnetic recording.

FIG. 3 illustrates a film disc, showing the image bearing film disc 46 and central hub 48. A smooth portion 50 is provided on the hub for magnetic recording.

A magnetic recording head 52 is modulated by control electronics 24 while the magnetic material is displaced relative to the head. The respective locations of the zoom servo and image sensor position servos are coded, for example using a standard binary coded decimal code, and recorded on the magnetic material in a conventional manner. The code may be associated with a particular frame either by its physical location, such as with strip film, or by a further code number that identifies the frame such as with disc film. According to a further feature of the present invention, the film video player also includes means for reading the encoded indicia, such as a magnetic read head 54. The control electronics is responsive to the indicia sensed by the magnetic read head to drive the zoom servo and the horizontal and vertical sensor position servos to the positions indicated by the encoded indicia. An auto-crop button 56 activates this feature of the video player. When the auto-crop button is on, and a new frame is selected by operating a frame advance switch 50, the video player automatically composes the new frame according to the coordinates stored on the film.

A magnetic code indicating the next frame to be viewed in the video player may also be applied for each frame. The control electronics sense this code, and automatically advance the film to the desired frame. Using this feature, film images may automatically be displayed in an order other than that in which they occur on the film strip or disc.

Figure 2:
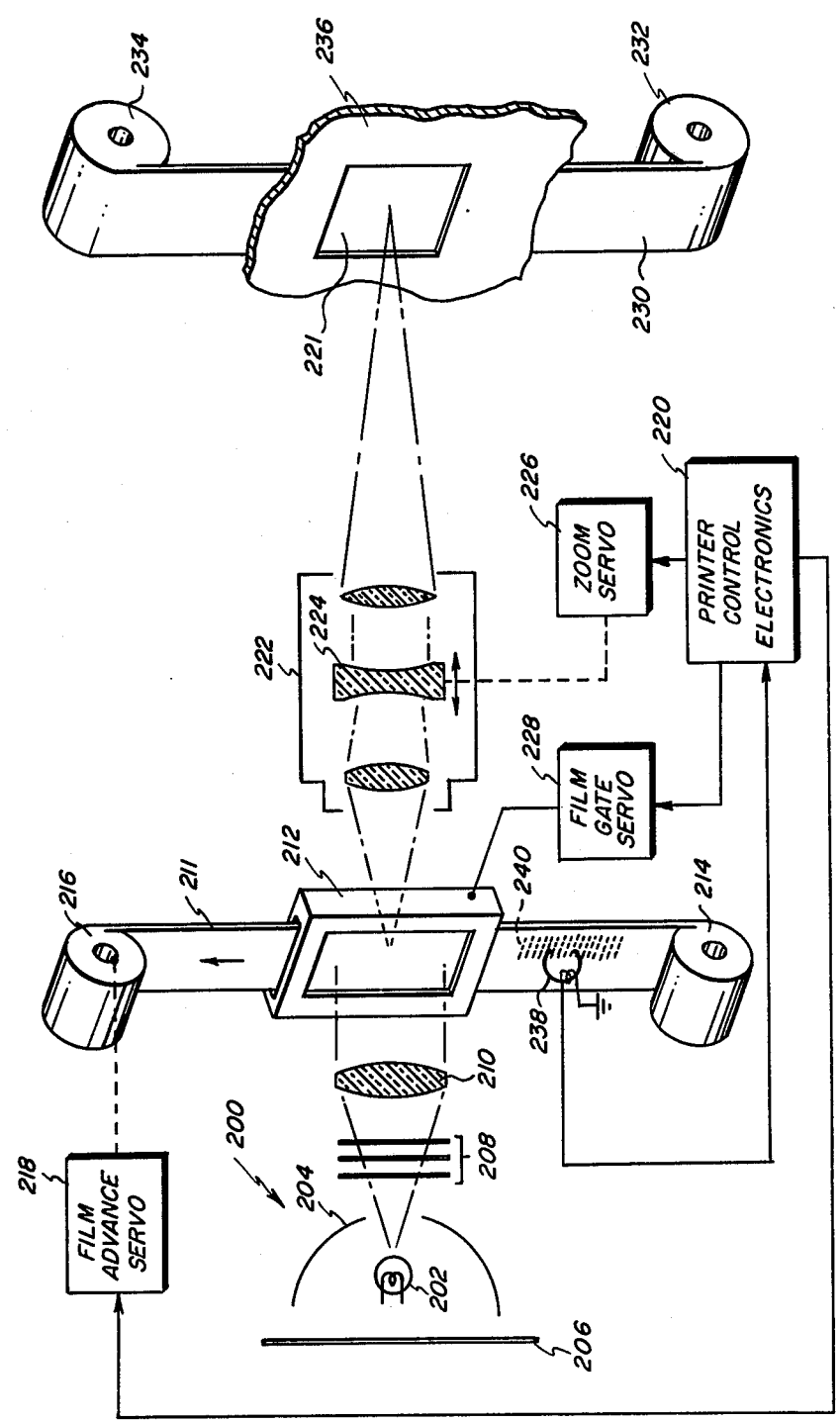
FIG. 2 is a schematic diagram of a printer according to the present invention, having means for sensing the recording information on the film, and for automatically adjusting the magnification and the horizontal and vertical position of the printed image according to the present invention.

After the photographer has composed a picture on the video player and recorded the cropping coordinates on the film, the film is sent to a photofinisher for printing. FIG. 2 shows a printer having means for varying the magnification of the print and for displacing the image with respect to the print medium, e.g. photographic paper.

The printer includes a conventional light source 200 comprising a lightbulb 202, a reflector 204, a cold mirror 206, filter pack 208, and a condenser lens 210. The photographic film 211 is supported in a movable film gate 212. The film is advanced from a supply 214 to a takeup 216 by a film advance servo 218, comprising for example, a stepper motor controlled by printer control electronics 220. An image of the film frame in film gate 212 is projected onto a paper plane 221 by a zoom lens 222 having a movable lens element 224 controlled by a zoom servo 226 for varying the magnification of the image of the film. The position of the film image on the paper plane is controlled in the direction of film movement by the film advance servo 218 and is controlled in the direction perpendicular to the movement of the film by a film gate servo 228.

Photographic paper 230 is moved from a supply 232 to a takeup 234 past an exposure gate 236 where the paper is exposed with the image of the film.

A magnetic head 238 senses the magnetic information on the film and supplies signals representing the cropping coordinates for the associated image to printer control electronics 220. The printer control electronics automatically adjusts the zoom lens servo 226, the film advance servo 218, and the film gate servo 228 to the coordinates encoded on the film, to set up the printer to make a print as composed by the photographer on the video player.

For disc format film, the horizontal and vertical displacement of the film frame image is preferably effected by displacing the axis of the disc with respect to the optical axis of the printer.

I claim:

1. A photographic printing system, comprising:
   a photographic film having an image and means for receiving coded information;
   film video player means for viewing the image on said film to produce a video signal for displaying said image on a video monitor, said video player means including means for selectively varying the magnification of the displayed image, and for selecting a portion of the magnified image to be displayed, by selectively translating the magnified image vertically and/or horizontally, and including recording means for applying coded information to the film representing a selected magnification and selected vertical and horizontal translation; and photographic printer means for producing reflection prints from said film image, said printer means including means for sensing the coded information on the film, and means responsive to the sensed information for adjusting the magnification and the horizontal and vertical translation of the printed image to make a print of the portion of the image that was selected on the film video player means.

2. The invention claimed in claim 1, wherein said film video player means further comprises means responsive to previously recorded coded information on said photographic film for automatically adjusting the magnification and vertical and horizontal translation of the displayed image in accordance with the previously recorded coded information.

3. The invention claimed in claim 1, wherein said means for receiving coded information comprises a magnetic recording medium, and said recording means, in said video player means, and said means for sensing the coded information, in said photographic printer means, comprise magnetic heads.

4. The invention claimed in claim 3, wherein said photographic film is strip film, and wherein said magnetic recording medium comprises a magnetic stripe carried by said photographic film.

5. The invention claimed in claim 3, wherein said magnetic recording medium comprises a transparent layer of magnetic recording material carried by said photographic film.

6. The invention claimed in claim 3, wherein said photographic film is disc film having a central hub, and said magnetic recording medium comprises magnetic material carried by said central hub.

7. The invention claimed in claim 2, wherein said means for applying coded information to the photographic film includes means for specifying a next selected film image for display, and including means for automatically advancing said photographic film to said next selected image in response to said sensed coded information, whereby film images may be displayed automatically in a selected order.

8. The invention claimed in claim 1, wherein said means for selectively varying the magnification of the displayed image comprises a zoom lens, and wherein said means for selectively translating the magnified image vertically and/or horizontally comprises a movable film gate and a film drive servo.

* * * * *